United States Patent [19]
Wrate

[11] Patent Number: 5,464,193
[45] Date of Patent: Nov. 7, 1995

[54] MULTI-FUNCTIONAL WIRE AND CABLE PULLING APPARATUS

[76] Inventor: Leonard A. Wrate, 386 Encino Dr., Vista, Calif. 92083

[21] Appl. No.: 183,301

[22] Filed: Jan. 19, 1994

[51] Int. Cl.⁶ ............................................. E21C 29/16
[52] U.S. Cl. ........................ 254/134.3 FT; 254/134.3 R
[58] Field of Search .................................. 254/362, 292, 254/266, 334, 335, 339, 134.3 R, 134.3 FT

[56] References Cited

U.S. PATENT DOCUMENTS

| | | | |
|---|---|---|---|
| 2,948,510 | 8/1960 | Kieser | 254/134.3 R |
| 3,072,383 | 1/1963 | Vanderhagen | 254/134.3 R |
| 4,270,734 | 6/1981 | Straight | 254/134.3 R |
| 4,497,470 | 2/1985 | Carter et al. | 254/134.3 FT |

*Primary Examiner*—Robert C. Watson
*Attorney, Agent, or Firm*—Brown, Martin, Haller & McClain

[57] ABSTRACT

A portable wire pulling device is disclosed which can be secured into pulling position and easily released. The device has a housing; a frame with vertical hollow posts, a sheave between the posts, a motor-driven extension clamp moveable outwardly from the posts to engage and secure to a stationary object; a motor driven capstan mounted on the housing; controls and selectors to select between AC and DC and to control the motors; and wheels and hand grips for moving the device; such that the device can be secured into position by the extension clamp and a wire feed pulling line attached to wires to be pulled routed over the sheave to the capstan and the wire pulled securely and evenly by the capstan. The device can be run on AC or DC power, or AC power can be used to charge internally mounted DC batteries. A full battery charge will allow the device to operate for a full eight-hour shift, and it can easily be recharged overnight. A number of pulling speeds can be obtained, depending on the type of control and selection device used, from slow speeds for precise control to fast speeds for high productivity.

14 Claims, 3 Drawing Sheets

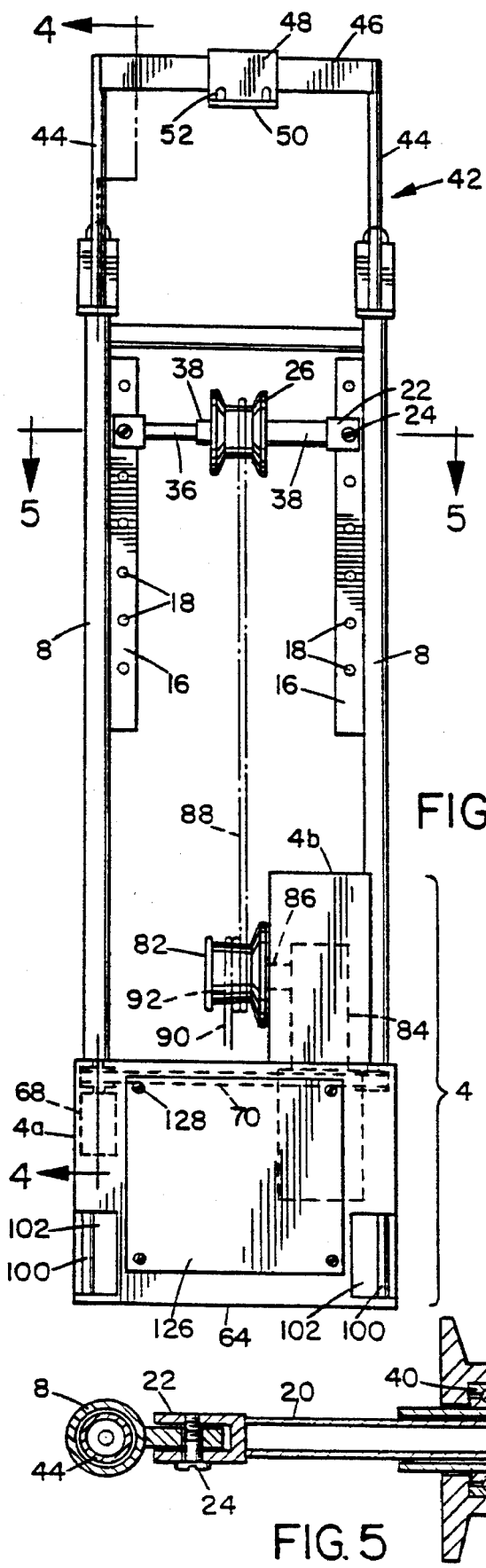
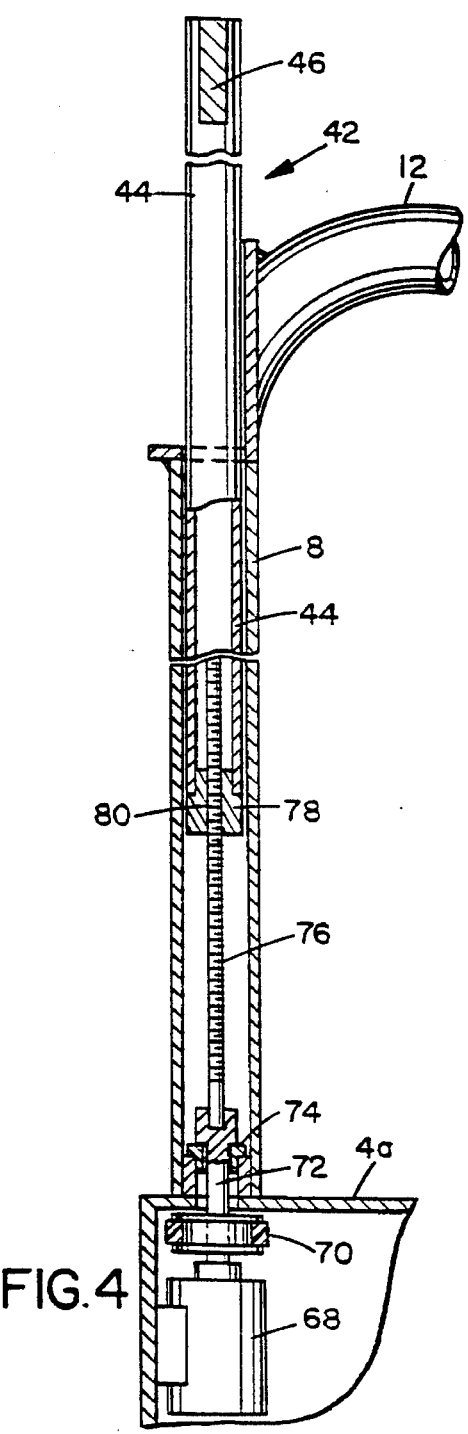
FIG. 3
FIG. 4
FIG. 5

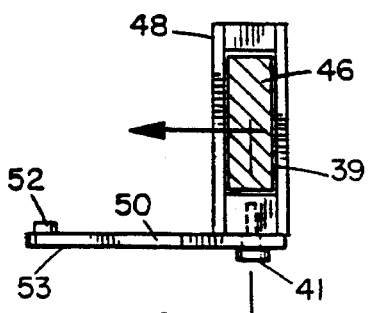
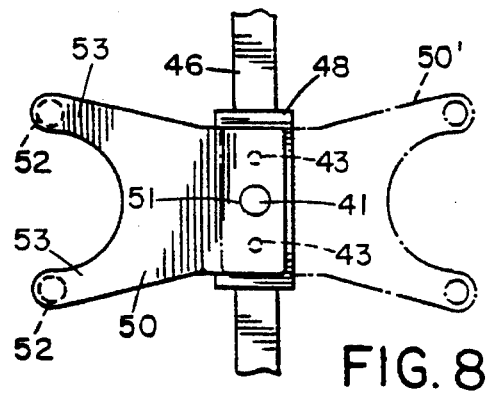
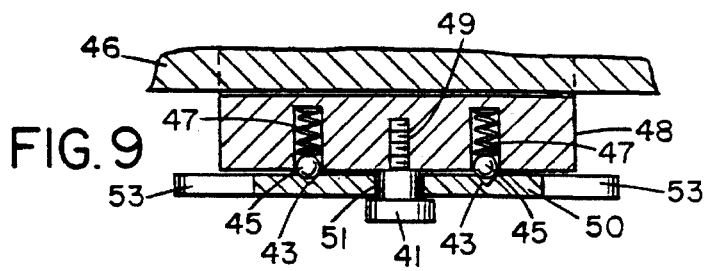
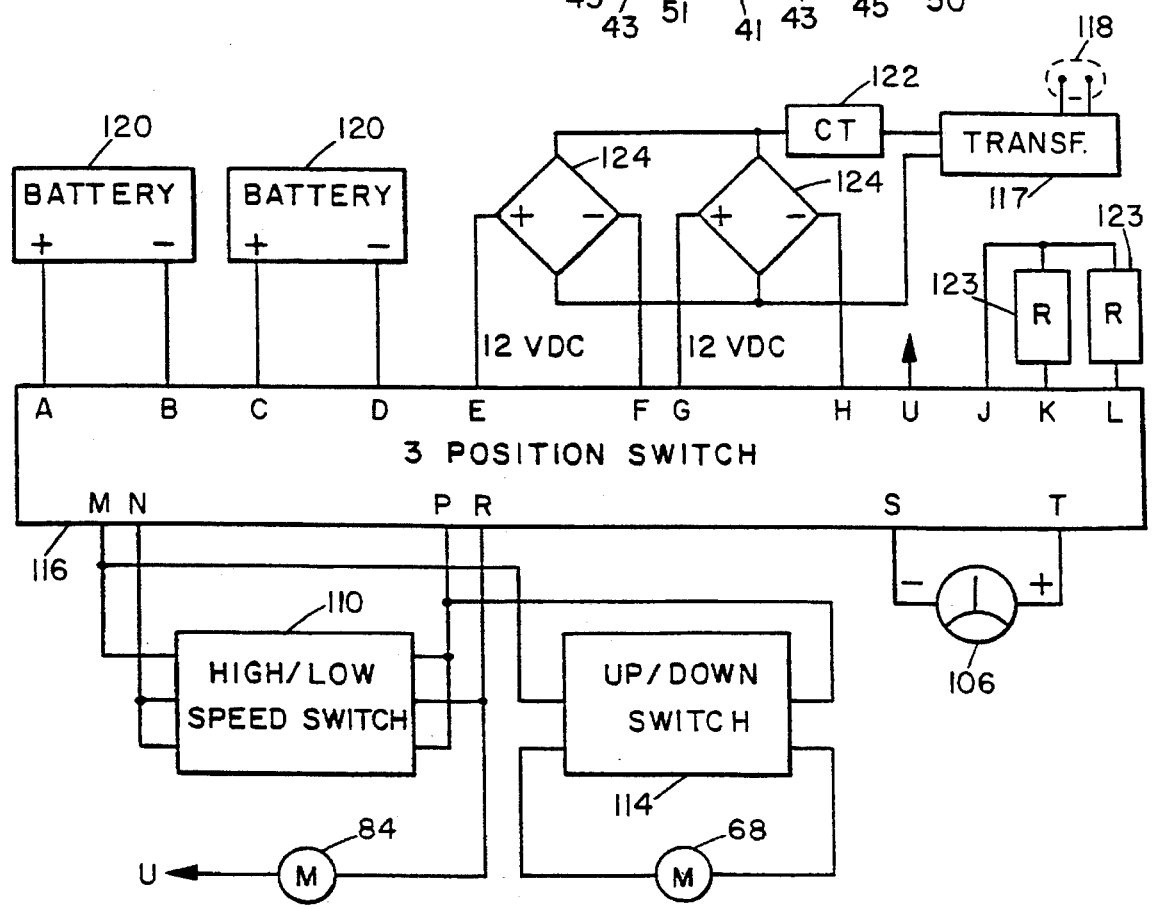

MULTI-FUNCTIONAL WIRE AND CABLE PULLING APPARATUS

BACKGROUND OF THE INVENTION

1. Field of the Invention

The invention herein relates to devices for pulling electrical wire and cable and optical fiber cable, and particularly to devices for use in residential, commercial or industrial construction and electrical contracting.

2. Description of the Prior Art

Wire pulling in commercial, residential and industrial construction, including renovation and remodeling, presents a wide variety of conditions and problems for the electrical contractor. The wire or cable to be pulled may be of a wide variety of sizes and strengths. Smaller diameter wires may be bundled into larger cables. Computer and other communication wires and cables may present cross-sectional profiles other than round. Wires may need to be pulled simultaneously from several locations into and through a single conduit. Cable materials may present special problems of susceptibility to damage, such as when optical glass fiber must be pulled.

In the past, most wire pulling machines have been stationary devices which were plugged into regular AC power lines and which were designed for pulling only a single type of cable or pulling at a single pulling rate. Such devices have many parts and are unwieldy and difficult to position and use. Further, their limited scope of operation required electrical contractors to keep an inventory of a variety of different pulling machines for different services.

Two years ago I developed and introduced the first practical portable, battery operated wire pulling machine to the electrical contracting industry. That product has proved highly popular and has overcome many of the problems previously encountered by the prior art devices. However, experience with that device has led to my recognition of the need for substantial further developments.

For instance, non-portable prior art devices are secured into position by such means as bolting, strapping and the like. Such, of course, is both impracticable and undesirable for a portable device such as my previous unit. Also, past units have been either AC powered or battery (DC) powered, but did not have the capability to utilize a variety of different power sources or to utilize them in different ways.

SUMMARY OF THE INVENTION

I have invented a wire pulling device which is easily portable but which can be as equally well secured into position as fixed devices, but yet allows ease of release without damage to the surroundings or impairing the portability and moveability of the device; which is capable of pulling at different speeds to provide the proper mix of production rate, safety and protection to fragile cables such as optical fibers; and which has the ability to take advantage of all of the normal sources of electrical power available on a job site. Specifically, my device is a movable wire pulling device which comprises a housing; a frame comprising a pair of spaced apart vertical members mounted on the housing; a sheave mounted between the vertical members and journalled for rotational movement; an extension clamp cooperating with the frame and moveable outwardly from the end of the vertical members distal to the housing, the extension clamp having means for engaging and securing to a stationary object; a capstan mounted on the housing and having first electrical motor means therewith to rotate the capstan; second electrical motor means for moving the extension clamp; at least two sources of electrical power, each capable of activating the first and second motors; control and first selection means to select between the two sources of electrical power and to control the operation of the first and second motors; and means for moving the device when desired; whereby the device can be secured into position adjacent a wire feed location by the extension clamp and a wire feed pulling line attached to wires to be pulled routed over the sheave to the capstan, the wire can be pulled securely and evenly by the capstan upon activation of the first motor.

The device can be run on AC or DC power, or AC power can be used to charge internally mounted DC batteries. A full battery charge will allow the device to operate for a full eight-hour shift, and it can easily be recharged overnight. A number of pulling speeds can be obtained, depending on the type of control and selection device used, from slow speeds for precise control to fast speeds for high productivity.

BRIEF DESCRIPTION OF THE DRAWINGS

FIG. 3 is a rear elevation view of the device;

FIG. 4 is an enlarged sectional view taken on line 4—4 of FIG. 3;

FIG. 5 is an enlarged sectional view taken on line 5—5 of FIG. 3;

FIG. 6 is a block wiring diagram of the control system of the device;

FIG. 7 is a cross-sectional elevation view of the clamping structure of the invention;

FIG. 8 is a plan view from below of the clamping structure; and

FIG. 9 is a cross-sectional view taken on line 9—9 of FIG. 7.

DETAILED DESCRIPTION AND PREFERRED EMBODIMENTS

Figure 1:
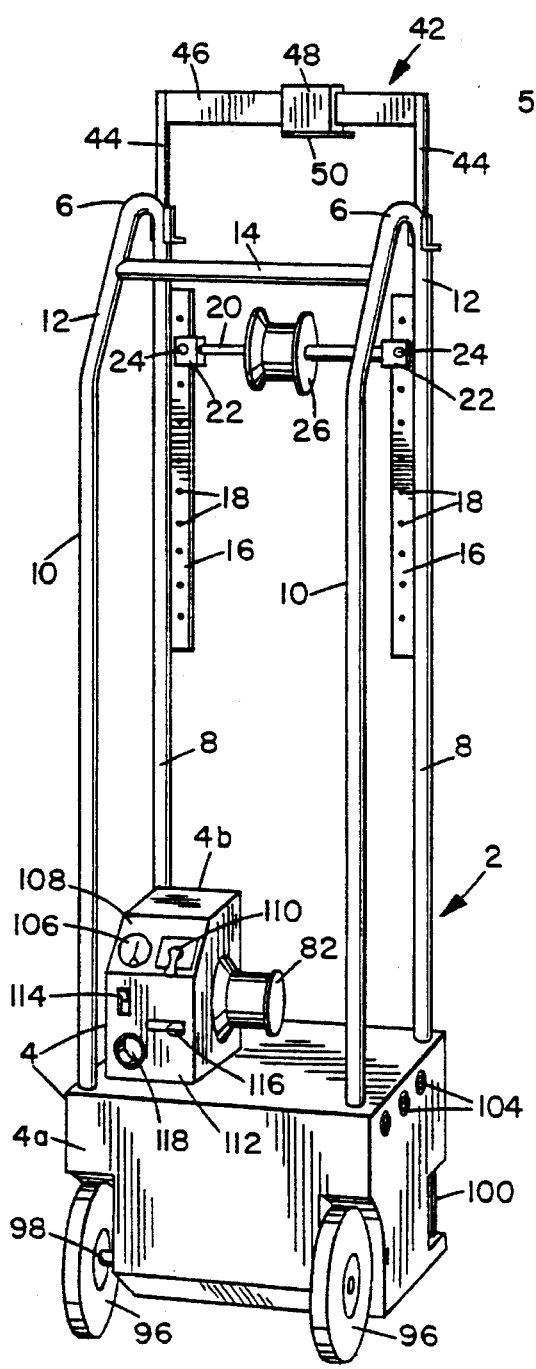
FIG. 1 is a perspective view of a preferred embodiment of the wire puller device of this invention.

The invention herein is best understood by reference to the drawings, considering first FIG. 1. The wire or cable pulling machine or device 2 has a housing 4, which in the preferred embodiment illustrated has two portions designated respectively 4a and 4b. As will be described below, housing 4a is used to enclose the batteries and the drive system for the clamping extension, while housing 4b encloses the capstan motor and the control and selection systems. This two-part housing is an optional alternative, and one preferred. However, it will be evident that single portion housings can be used or that additional portions of the housing can be present if, for instance, it is desired to separate the control and selection systems further. Air vents 104 are built into housing 4a to help keep the batteries cool and to vent any gas which may be evolved from the batteries; the holes 104 are preferably covered with wire mesh.

For best operation of the device, it is preferred that the components with the greatest weight, generally the batteries, be placed as low as possible so that the center of gravity of the device will also be low for stability. This will also aid in securing the device in operating position.

Mounted on the housing 4 is a vertically extending frame 6, which includes two substantially identical vertical members 8, which are preferable hollow tubes. For strength and rigidity, the frame 6 also contains other vertical members 10 which are joined to members 8 by intermediate members 12, which will usually have a sloped or curved configuration. One or more horizontal braces 14 maintain the lateral spacing of the members 8, 10 and/or 12 where necessary or desirable.

Each vertical member 8 has attached thereto an adjustment plate 16 which contains a series of holes 18 or other attaching devices to which a horizontal axle 20 may be attached as by brackets 22 and secured by pins or bolts 24 through one of the pairs of holes 18. Mounted on axle 20 is sheave 26. The radius and width of sheave 26 will be dependent on the type of wiring or cable to be pulled, and typically will range in size from a radius of 2" to 8" (5 to 20 cm) and widths of 3" to 6– (7.5 to 15 cm). Sheave 26 is usually merely journaled on axle 20 and can slide along the axle to be positioned closely adjacent the actual position of the wires to be pulled. It will be evident from FIG. 1 that it is very easy for the operator to change sheaves simply by dismounting one or both of the brackets 22 of the axle 20 and mounting a new sheave 26 on the axle 20, then remounting the brackets 22. Alternatively, one could install an entire new axle/sheave set through its brackets 22.

In a further useful option, axle 20 may be in the form of a telescoping two-part axle as illustrated in FIG. 5, in which the smaller diameter portion 36 telescopically slides within the larger portion 38. Sheave 26 is mounted by a ball-bearing journal 40 onto the larger portion 38 of the axle 20. Having a telescoping axle 20 makes it easier to dismount the sheave/axle combination set for replacement with a different size sheave and also allows the same sheave/axle set to be used with devices of this invention having different spacing of the vertical members 8.

A particularly important element of the present invention is the moveable extension clamp 42, the operation of which is best illustrated in FIGS. 2–4 and 7–9. The extension clamp 42 comprises two vertical members 44 which are telescopically inserted into the upper hollow ends of vertical members 8. It is preferred that vertical members 8 be hollow tubes of the same inside diameter throughout their entire length, but as will be discussed below it is possible that different interior diameters can be used to accommodate the different sizes of shafts that will be within members 8.

The clamp 42 has a horizontal crossbar 46 mounted between the two vertical members 44. Mounted on the horizontal bar 46 is clamping member 48, which has a hole 39 through it to enable it to slide along bar 46, so that it can be aligned to grip in the most desirable position. Mounted on the bottom of member 48 is a flat horizontal plate 50 with one or more upward projections 52. In a preferred configuration, projections 52 are formed or mounted at the ends of arms 53. Pivot bolt 41 passes through hole 51 in plate 50 and is threaded into socket 49 in the member 48, to allow plate 50 to swivel 360°. Detents 43 are formed in the top of plate 50 to allow the plate to be held at the two opposite fore-and-aft positions indicated in FIG. 6 (the normal forward position being indicated in solid lines and the reversed position being indicated as plate 50' in phantom). Small balls 45 urged by springs 47 drop into detents 43 to secure the plate 50 in either of the two positions. Plate 50 would be positioned in the rearward orientation only when it was not desired to use the box-engaging capability of the projections 52, as where the clamping system 42 can be braced against a ceiling or other overhead structure and must be positioned flush against a wall or box front where the plate 50 would interfere or could mar the wall.

Figure 2:
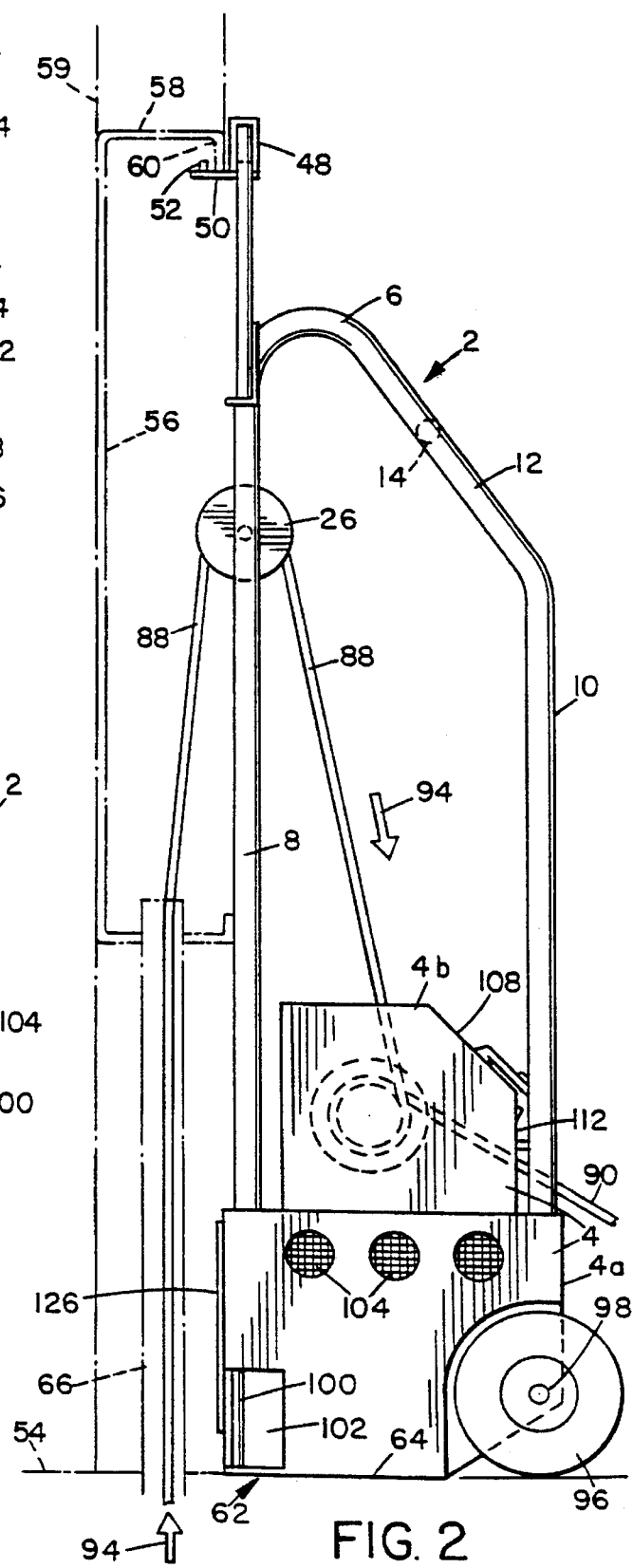
FIG. 2 is a side elevation view of the same device stationed at a wall mounted junction box to pull a wire.

The operation of the clamp 42 is best illustrated in FIG. 2. The device 2 sits on a floor 54 in front of a wire box 56. Box 56 is commonly mounted on or between vertical studs 59. The top 58 of box 56 normally has a downwardly extending flange 60. (The studs 59 represents any kind of wall, panel, or the like on which the box 56 can be mounted. Studs are illustrated because the most common setting for use of this device is for pulling wire in building construction projects in which there are unfinished, stud-framed walls in place with the electrical boxes mounted thereon.) Wires are to be pulled through conduit 66, which extends upwardly into box 56. (It will also be understood that conduit 66 may also enter the box from the sides or top, and that the device of the current invention may be used to pull wires through those conduits as well. The upward configuration is illustrated because it is a very common and typical configuration.)

The device 2 is positioned such that the clamp 42 is adjacent to the flange 60 of box top 58 so that plate 50 projects forward under the flange 60 and the projections 52 are on the opposite side of the flange 60 from the crossbar 46. If necessary the member 48 is slid along the bar 46 so that it aligns as much as possible with conduit 66, even if the device 2 itself must be offset slightly from the location of the conduit 66. This could occur, for instance, where the box 56 is positioned in the corner of a room and the conduit 66 enters near a corner of the box rather than being centered in the box. The extension clamp 42 is then driven upwardly (by means described below) so that the plate 50 engages the bottom edge of flange 60. There is then a small additional amount of movement upward of the clamp 42 so that device 2 along its bottom surface 64 of housing 4a (or at least in the area of the bottom surface designated 62) and plate 50 form a wedging action which locks the device 2 into position against the box 56. Unwanted movement of the portable device 2 during pulling is therefore eliminated, so that the wires may be more effectively pulled through conduit 66.

Upward and downward motion of clamp 42 is accomplished by the mechanism shown in FIG. 4. A drive motor 68 is mounted inside housing 4a and turns screw rod 76 through reduction gear set 70 and shaft 72 journalled in bearing 74. Screw rod 76 in turn is threaded through bottom block 78 of vertical member 44, which bottom block 78 has a matching internal screw thread 80, such that rotating rod 76 causes vertical member 44 to move upward or downward vertically, allowing it to engage or disengage flange 60 through plate 50. The motor 68 is preferably an electric motor but could if desired be a pneumatic or hydraulic motor. The controls for the preferred electric motor 68 will be described below.

Another important feature of the device of the present invention is capstan 82 which is mounted on housing 4b in alignment with sheave 26. Capstan 82 is driven by motor 84 through shaft 86. The rotational speed of capstan 82 will be controlled as described below.

In operation, a cable lead line 88 is initially installed in a conduit 66 when the conduit is put in place in new residential, commercial or industrial building construction or in rebuilding or remodeling of such a building. The lead line 88 is not normally itself a wire or cable but rather is a rope or cord to which the desired wire or cable can ultimately be attached at the opposite end of conduit 66 from the position of the device 2. When it is time to pull the cable, the device 2 is positioned and clamped into place, the operator loops the lead line 88 over sheave 22 and takes several turns around capstan 82 as shown at 92. The motor 84 is then activated to drive capstan 82 at the desired rotational speed while the operator continually retrieves the bitter end 90 of lead line 88 as the line moves in the direction indicated by the arrows 94. Eventually, of course, the entire lead line 88 will pass through conduit 66 pulling with it the end of the desired wire or cable (not shown) and then the motor 84 can be turned off and the lead line 88 disconnected from the wire or cable with the end of the wire or cable left free for subsequent workers to connect to various pieces of electrical or optical fiber equipment.

The portability of the device is accomplished in at least two ways. First, mounted on the device are wheels 96. When the device is no longer clamped to the stud 56 (by retraction of the clamp 42), the device can easily be tilted backward toward the operator (who holds onto the vertical members 10) so that the device pivots on axles 98 of wheels 96. It can then be freely rolled to a desired new location in the same manner as a dolly or hand truck. The wheels are conveniently 10" (25 cm) diameter. Second, the housing 4a also preferably includes a pair of handles 100 recessed into the housing at 102, so that the device can be lifted and carried, as for instance when mounting stairs or loading the device 2 into a truck for transport.

The controls manipulable by the operator are illustrated in FIG. 1. (The exemplary arrangement illustrated in FIG. 1 will be understood to be only one of many which can be selected.) An ammeter 106 is mounted on a sloped surface 108 of housing 4b, along with selector switch 110 for controlling the speed of motor 84 and driving capstan 82. In the embodiment illustrated herein, the selector switch has two positions, a fast speed and a slow speed, but it will be evident that variable speed switches can be used to provide a constantly variable range of speeds. It has been found particularly useful to have at least two of the speeds of the capstan 82 be such that the lead line 88 can be moved at a linear speed of 30 feet per minute (0.15 m/sec; slow speed) or 60 feet per minute (0.30 m/sec; fast speed). The slow speed is particularly advantageous for providing safe positive control for delicate wire pulling (as for instance with optical fiber) while the fast speed provides greater efficiency for high production pulling. Typically, the capstan will have a diameter on the order of about 5" to 8" (12 to 20 cm) and a width sufficient to enable several turns of the lead line 88 to be wrapped around the capstan. This width is commonly on the order of about 4" to 7" (10 to 18 cm). With the typical capstan motors and drives conventionally available, pulling capacities up to as much as 4000 lbs. (18 kN) can be achieved.

Mounted on vertical surface 112 of housing 4b is a three-position selector switch 116 for selecting among AC power, DC power or battery charging, as will be described below, as well as up/down switch 114 controlling vertical movement of the extension clamp 42 and socket 118 to allow connection to external AC power.

Representative circuitry for the drive motors, controls, and selectors is illustrated in FIG. 6. As noted above, located in housing 4a are one or more (preferably two) batteries 120, which for safety will normally be fully sealed batteries. These are 12 VDC batteries which for convenience can typically be heavy duty sealed automotive batteries, thus making battery replacement easy and inexpensive for the contractor. The batteries 120 can be used to power both motors 68 and 84. Alternatively, however, AC power can be provided through socket 118 (from an external source not shown) to step-down transformer 117, where it is reduced to 12 VAC and then rectified to 12 VDC by rectifiers 124 either to charge batteries 120 (with the rest of the system off) or to run motors 68 and/or 84. The choice will be up to the operator. For instance, on a job site where the AC power is readily available, the operator may choose to plug in an AC power line to socket 118 and run the unit directly from the outside AC power, thus conserving the batteries 120 during operation of the motors 68 and 84. Similarly, where AC power is available only for intermittent periods, the operator can use the batteries when no AC power is available and then use the AC power either to continue running the device or to charge the batteries 120. Finally, where AC power is either unavailable or the unit is to be moved frequently and reconnection to AC power at the different locations on a frequent basis would be inefficient, the operator may choose to run continuously from the batteries 120. I have found that two 12 volt DC batteries in good condition and initially fully charged can readily operate the motor 68 and 84 during a normal work shift for approximately eight hours, and that the batteries may be fully recharged in no more than 12 hours from a normal AC power source. The length and speed of charging are determined by the conventional charge timer 122.

The choice of AC power, battery charging and operation from DC battery power is determined by the user through the positioning of three-position switch 116 as shown in FIG. 6. The switch is configured to make the following interconnections between the letter-designated terminals for each selection:

TABLE 1

| SWITCH POSITION INTERCONNECTIONS | | |
|---|---|---|
| For AC Power | For Battery Charging | For DC Power |
| E–M | A–K | A–M |
| F–P | B–F | B–P |
| G–N | C–L | C–N |
| H–R | D–F | D–R |
| M–S | E–T | M–S |
| T–U | F–D | T–U |

A front panel 126 attached by screws 128 is preferably incorporated into housing 4a to permit easy access to the batteries 120 or motor 68 inside. A similar panel (not shown) may be provided on housing 4b, or housing 4b may be formed in a conventional manner with panels 108 and 112 being removable for access to the various control and selection switches, meters and socket.

In a preferred embodiment, the device is approximately 70" (1.8 m) high, measured to the top of the arched intermediate members 12 with the clamp 42 fully retracted. The overall width between the outer lateral walls of housing 4a is commonly 20" (51 cm). These dimensions permit the device to be easily rolled or carried through typical doorways on a construction site or even through unfinished but framed walls where the framing is on at least 24" (61 cm) centers.

It will be evident from the above that there are numerous embodiments to the present invention which, while not expressly described above, are clearly within the scope and spirit of the invention. Therefore, the above description is intended to be exemplary only, and the actual scope of the invention is to be determined solely by the appended claims.

I claim:

1. A movable wire pulling device which comprises:

a housing;

a frame comprising a pair of spaced apart vertical members mounted on said housing;

a sheave mounted between said vertical members and journalled for rotational movement;

an extension clamp cooperating with said frame and moveable outwardly from the end of said vertical members distal to said housing, said extension clamp having means for engaging and securing to a stationary object;

a capstan mounted on said housing and having first electrical motor means therewith to rotate said capstan;

second electrical motor means for moving said extension clamp;

at least two sources of electrical power, each capable of activating said first and second motors;

control and first selection means to select between said two sources of electrical power and to control the operation of said first and second motors; and means for moving said device when desired;

whereby, said device can be secured into position adjacent a wire feed location by said extension clamp and a wire feed pulling line attached to wires to be pulled routed over said sheave to said capstan, said wire can be pulled securely and evenly by said capstan upon activation of said first motor.

2. A device as in claim 1 wherein the location of said sheave along said vertical members of said frame is adjustable.

3. A device as in claim 1 wherein said control and first selection means is located in said housing and operable from a surface thereof.

4. A device as in claim 1 wherein said two sources of electrical power comprise an AC electrical power line and a DC electrical power battery.

5. A device as in claim 4 wherein said DC battery is mounted within said housing.

6. A device as in claim 4 wherein said selection means further permits selection between application of said AC electrical power line to activate said first and second motors directly and application of said AC electrical power to charge said DC battery.

7. A device as in claim 1 wherein said means for moving said device comprises a pair of wheels mounted on said device.

8. A device as in claim 7 further comprising means to enable said device to be tilted on said wheels such that an operator can manually transport said device on said wheels.

9. A device as in claim 1 wherein said means for moving said device comprises handles mounted on said device to permit manual lifting and carrying of said device.

10. A device as in claim 1 wherein said first motor is operable to rotate said capstan at a plurality of speeds.

11. A device as in claim 10 further comprising second selection means to select the speed at which said capstan is rotated.

12. A device as in claim 11 wherein said second selection means is located in said housing and operable from a surface thereof.

13. A device as in claim 10 wherein said speeds include rotational speeds which will move a pulled wire at a linear speed of between 30 and 60 feet per minute.

14. A device as in claim 1 wherein a surface of said housing and said vertical members are substantially aligned such that said device can be placed in close proximity to said wire feed location.

\* \* \* \* \*